United States Patent [19]

Kosonen

[11] 3,796,321
[45] Mar. 12, 1974

[54] APPARATUS FOR PROCESSING WATER

[75] Inventor: Pentti Einari Kosonen, Saltsjo-Boo, Sweden

[73] Assignee: AB Gustavsbergs Fabriker

[22] Filed: May 15, 1972

[21] Appl. No.: 253,267

[30] Foreign Application Priority Data
May 24, 1971  Sweden.............................. 6659/71

[52] U.S. Cl................. 210/202, 210/206, 210/207, 210/256, 210/320, 210/521
[51] Int. Cl........................... C02b 1/20, C02c 1/40
[58] Field of Search.......... 210/42, 44, 46, 47, 195, 210/199, 202, 203, 205, 206, 220, 221, 256, 320, 521, 207

[56] References Cited
UNITED STATES PATENTS

| | | | |
|---|---|---|---|
| 3,495,711 | 2/1970 | Englesson et al. .............. | 210/256 X |
| 3,313,795 | 4/1967 | Rubin ............................. | 210/44 X |
| 349,990 | 9/1886 | Gaillet et al. ....................... | 210/521 |
| 2,391,738 | 12/1945 | Prager................................. | 210/46 |
| 2,355,069 | 8/1944 | Green ................................ | 210/46 |

FOREIGN PATENTS OR APPLICATIONS

| | | | |
|---|---|---|---|
| 175,192 | 5/1905 | Germany ............................ | 210/46 |

Primary Examiner—John Adee
Assistant Examiner—Robert H. Spitzer
Attorney, Agent, or Firm—Toren, McGeady and Stanger

[57] ABSTRACT

An apparatus for processing water, particularly for treating waste water, consists of two vertical cylindrical containers, one placed inside the other. Water is supplied to the inner container, where coarse particles precipitate on the bottom. The water now flows through the annular gap between the two containers, where a precipitating agent is added and the particles thus produced precipitate on the bottom of the annular gap.

2 Claims, 4 Drawing Figures

APPARATUS FOR PROCESSING WATER

The invention relates to an apparatus for processing water by means of chemical precipitation and sedimentation. The invention can be used to process various types of water, such as drinking water, but is particularly directed to processing waste water. The invention specifically relates to the precipitation of phosphates in the waste water by the addition of aluminium sulphate.

The object of the invention is primarily to provide an apparatus which is simple in construction and of reasonable size, for use in treating waste water from a small number of dwellings. Another object of the invention is to provide an apparatus which is efficient since the precipitation and sedimentation take place under favourable conditions. Another object of the invention is to provide an apparatus having a minimum of movable parts and which is operated solely by the water flowing through it.

The apparatus according to the invention is characterized in that it comprises a first container in the form of a vertical cylinder to separate larger particles, a second container in the form of a vertical cylinder to separate precipitated particles, the second, larger container surrounding the first container so that an annular gap is formed between the walls of the containers, a partition wall in the annular gap, a channel for the supply of water from the first container to a precipitation zone in the annular gap on one side of the partition wall, a dosing means for the supply of a precipitant to said precipitation zone, whereby the precipitate formed is deposited at the bottom of the gap during the passage of the water around the annular gap, and an outlet conduit for the water thus treated from the annular gap, on the other side of the partition wall.

The separation of larger particles in the first container may be done by allowing the particles to become deposited on the bottom of the container. In an apparatus for processing drinking water a sieve or filter may be arranged in the first container.

The first container suitably has a diameter which is 50 - 70 percent of the diameter of the second container.

After precipitant has been added, it has been found advisable to allow the water to flow through a channel which expands so that the flow rate decreases. This contributes to the formation of flock during the precipitation, which can then develop relatively unhindered. The precipitate is thus obtained in a form which is easily deposited. According to a preferred embodiment, therefore, a plurality of vertical partition walls are arranged in the precipitation zone, which are placed with successively increasing spaces between them and so that the water is forced to pass between the partition walls in a direction from the narrowest gap towards gradually wider gaps. Suitably the partition walls are mounted so that the water is forced to pass downwardly in one gap and upwardly in the subsequent gap.

The water and precipitant should preferably be supplied to the precipitation zone in predetermined quantities. According to a preferred embodiment this is achieved by permitting the water from the first container to run into the precipitation zone through a dosing scoop which, when it has been filled with a specific quantity of water, flips over due to the weight of the water and the water runs down into the precipitation zone. When the dosing scoop flips over it activates a dosing apparatus for the precipitant, which has preferably liquid form, whereupon the dosing apparatus supplies a specific quantity of precipitant which mixes with the water in the scoop or in the precipitation zone. When the water runs from the first container to the dosing scoop and then on to the precipitation zone, it will absorb oxygen from the air which is desirable in processing waste water.

The invention will be further explained in the following with reference to the accompanying drawings which show an apparatus for processing waste water from households.

Figure 1:
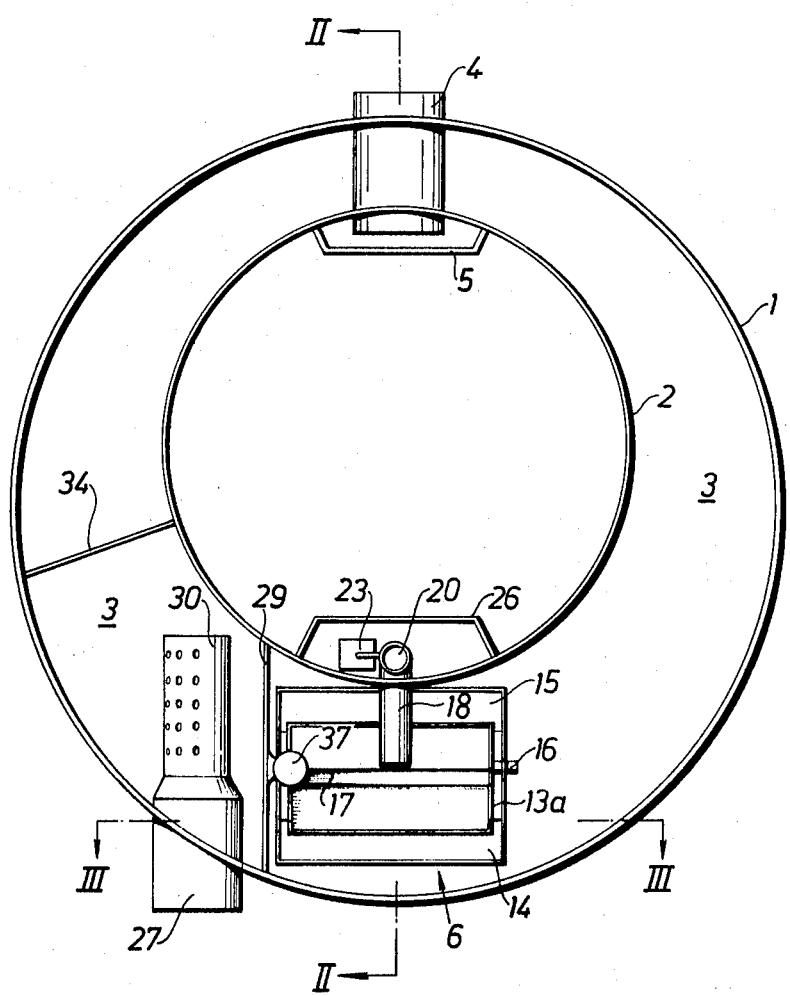
FIG. 1 shows the apparatus seen from above.
Figure 2:
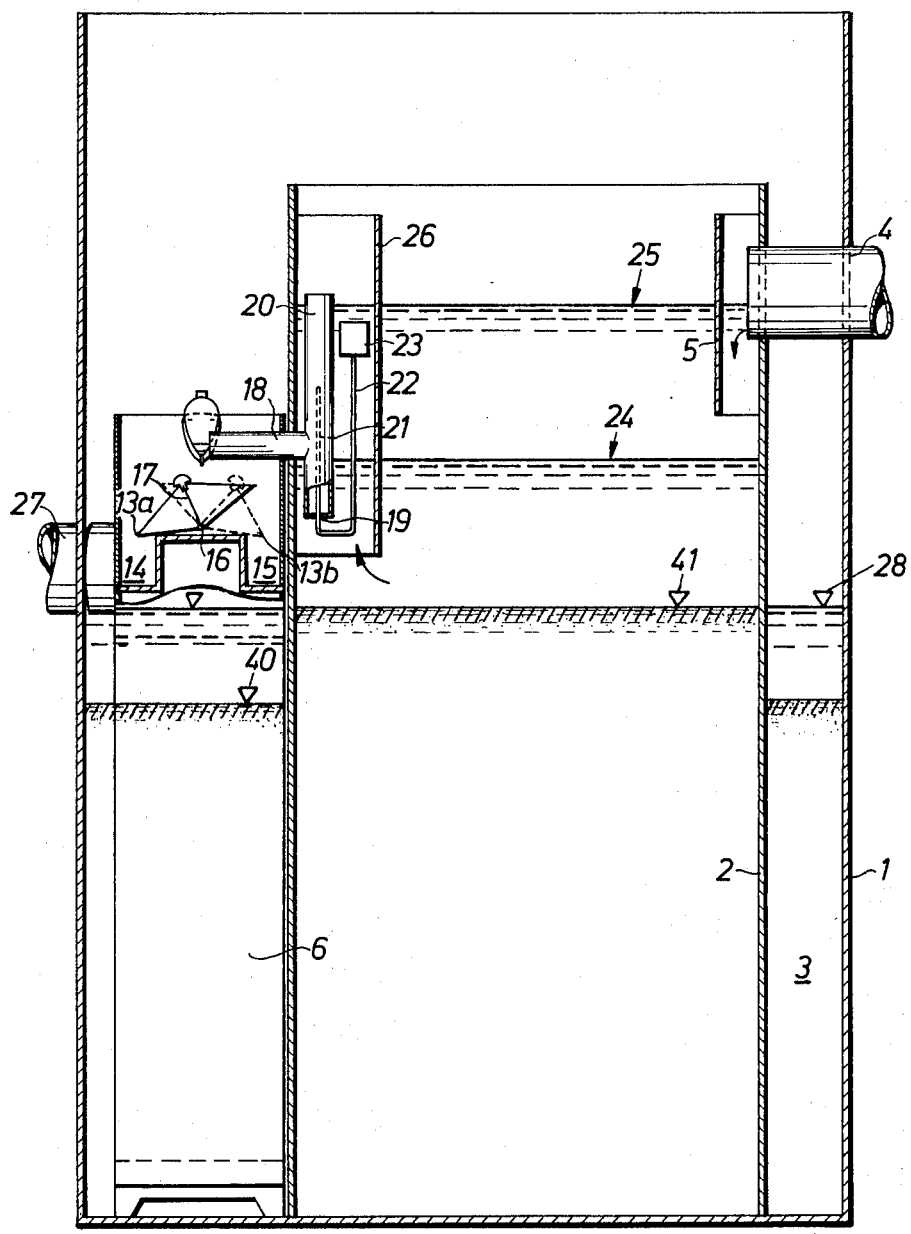
FIG. 2 shows a section along the line II—II in FIG. 1.
Figure 3:
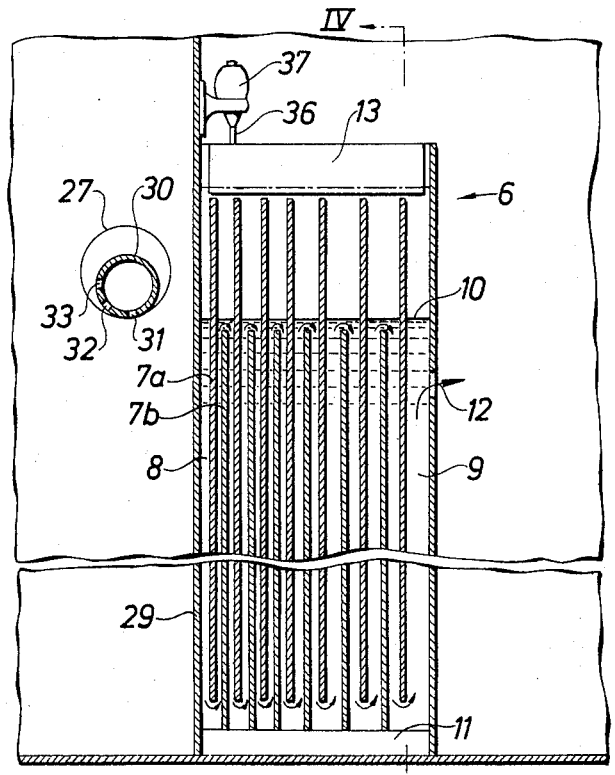
FIG. 3 shows a section along the line III—III in FIG. 1.
Figure 4:
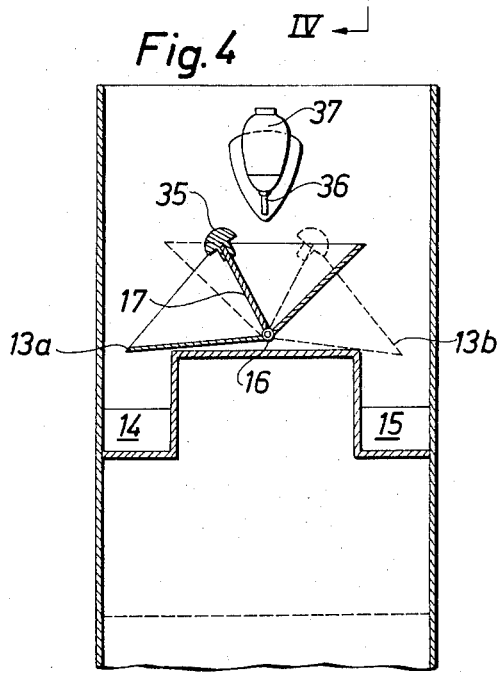
FIG. 4 shows a section along the line IV—IV in FIG. 3.

The apparatus according to the drawings comprises two vertical, cylindrical containers, viz. an outer container 1 and an inner container 2. The two containers are placed eccentrically in relation to each other and the annular gap 3 between them therefore varies in width. Water to be processed is supplied to the inner container 2 through a pipe 4. In front of the orifice of the pipe 4 is a plate 5 which prevents the water from running into the container 2 so rapidly that the contents become stirred.

In the widest part of the annular gap 3 a precipitation zone 6 is arranged. This comprisea a plurality of parallel, vertical plates 7. Each two plates 7b extend from a bottom plate 11 almost up to the desired water level 10, and each two plates 7a have their edges slightly above the bottom plate 11 and extend up over the water level 10. The water is therefore forced to flow in the direction of the arrows from the inlet gap 8 to the outlet gap 9, from where it leaves the precipitation zone through an opening 12. The distance between two adjacent plates increases successively from the inlet to the outlet.

Above the precipitation zone 6 is a dosing scoop 13 which is pivotably mounted on a horizontal axis 16 so that it can flip between a first position 13a and a second position 13b. The dosing scoop is divided into two sections by a partition wall 17. Below the dosing scoop are two parallel channels 14 and 15 which are slightly inclined, the lower ends being located over the inlet gap 8 to the precipitation zone. In position 13a one section of the dosing scoop has emptied its contents into the channel 14. If water is now supplied through a refill pipe 18 having an opening directly above the axis 16, the other chamber of the dosing scoop will be filled. When this chamber has received a specific quantity of water the center of gravity of the dosing scoop, which is higher than the axis 16, will shift to the left of a vertical line through the axis 16. The scoop will therefore tilt over to the position 13b, the water running down into the channel 15 and on to the inlet gap 8 of the precipitation zone.

At one end of the dosing scoop is a ridge 35 which, when the scoop changes position, raises the valve 36 of a dosing apparatus, 37. A specific quantity of a solution of a precipitant then runs down from the dosing apparatus 37 into the scoop 13. Water and precipitant will therefore be mixed in a certain proportion.

The water runs from the container 2 to the dosing scoop 13 through the pipe 18 which is connected at its inner end to a vertical pipe 20 which extends above the highest permitted water level 25 in the container 2. The lowest water level 24 is determined by the tube 18. A rod 21 extends through an orifice 19 into the lower end of the pipe 20. The other end of the rod 21 is connected to a rod 22, the upper end of which is attached to a float 23 floating on the water in the container 2. Due to the movement of the water the float 23 and thus the rod 21 will move up and down and even slightly sideways, thus keeping the orifice 19 free from impurities in the waste water which would otherwise block the relatively small opening.

A screen 26 is arranged around the float 23 and the pipe 20. The screen protrudes into the water and thus prevents slurry floating on the water in the container 2 from reaching the precipitation zone 6.

The second container 1 is provided with an outlet tube 30 which determines the water level 28 in the annular gap 3. The outlet tube 30 is located near the precipitation zone 6 and is separated from this by a vertical partition wall 29. The water leaving the precipitation zone 6 must therefore flow through the entire annular gap 3, whereupon the flock formed in the precipitation zone is deposited on the bottom of the gap 3. When the bottom layer reaches the level 40 it can be removed with the help of a slurry exhauster, for example, as with the sludge deposited in the first container 2, when said sludge layer reaches the level 41. The rear end of the outlet tube 30 is closed and its front end opens into a tube 27 which leads the processed water to a recipient. The outlet tube 30 is provided along its length with three rows of holes, a row of small holes 31 along the bottom of the tube, a row of somewhat larger holes 32 slightly higher on the tube wall, and a row of even larger holes 33 still higher up on the tube wall. If the flow of water is slight, the water from the gap 3 will flow into the tube 30 through the lowest holes 31 and then flow through the pipe 27 to the recipient. If the flow of water is stronger, the water level rises and the water then flows into the tube 30 through the holes 32 as well or, if the flow is even faster, through the holes 33 as well. The arrangement with holes increasing successively in size results in a uniform flow of water through the apparatus even if the water is supplied irregularly. This is an advantage for the precipitation and sedimentation.

A screen 34 protruding down into the water prevents slurry floating on the surface from reaching the outlet tube, 30.

I claim:

1. Apparatus for processing water, preferably waste water, by means of chemical precipitation and sedimentation, comprising a first container in the form of a vertically extending cylinder arranged for the separation of larger particles, a second container in the form of a vertically extending cylinder laterally enclosing said first container and spaced outwardly from it and forming an annular gap therebetween, said second container being arranged eccentrically relative to said first container so that said annular gap is of varying width, a vertically extending partition wall extending across said annular gap from said first container to said second container, means forming a precipitation zone in said annular gap at the location of its maximum width, a conduit for conducting water being processed from said first container into the precipitation zone in said annular gap, said partition wall located adjacent said precipitation zone, a pipe for flowing the water to be processed into said first container from a source exterior of said first and second containers, means for conveying the water being processed from said first container into said second container and said means includes a dosing means for adding a precipitant into the precipitation zone as the water being processed is directed into the precipitation zone, said means forming a precipitation zone comprises a first vertically extending wall, a second vertically extending wall spaced horizontally from said first wall, a plurality of vertically extending horizontally spaced plates disposed in approximately parallel relationship with one another and with said first and second walls and located between said first and second walls, said first wall and the adjacent said plate forming an inlet gap therebetween, said second wall and the adjacent said plate forming an outlet gap therebetween, said plates arranged to form a vertically extending tortuously-shaped flow path extending from said inlet gap to said outlet gap, the horizontal spacing between said plates increasing from said inlet gap to said outlet gap, an outlet conduit from said annular gap to a location exterior of said second container, said outlet conduit located adjacent said partition wall on the opposite side of said partition wall from said precipitation zone so that the water being processed flows from said outlet gap of said precipitation zone through said annular gap about said first container to said outlet conduit and due to the presence of the precipitant forms a precipitate which is deposited at the bottom of said annular gap.

2. Apparatus for processing water, as set forth in claim 1, wherein said dosing means comprises a dosing apparatus, a tiltable dosing scoop with an upwardly projecting ridge, said scoop arranged to receive a specific quantity of water from said first container and to receive a quantity of precipitation liquid from said dosing apparatus based on the quantity of water received from the first container and to direct the water and the precipitation liquid into the precipitation zone.

* * * * *